US007668969B1

(12) United States Patent
Kashyap et al.

(10) Patent No.: US 7,668,969 B1
(45) Date of Patent: Feb. 23, 2010

(54) RULE STRUCTURE FOR PERFORMING NETWORK SWITCH FUNCTIONS

(75) Inventors: Prakash M. Kashyap, Cupertino, CA (US); Thanh Nguyen, San Jose, CA (US); Joel Aller, San Jose, CA (US); Mike Yip, Los Altos, CA (US); Boon Ling Chew, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 872 days.

(21) Appl. No.: 11/116,950

(22) Filed: Apr. 27, 2005

(51) Int. Cl.
*G06F 15/173* (2006.01)
(52) U.S. Cl. ........................ 709/238; 370/360
(58) Field of Classification Search ................. 709/238; 370/360
See application file for complete search history.

(56) References Cited

U.S. PATENT DOCUMENTS

| | | | |
|---|---|---|---|
| 6,089,456 A | 7/2000 | Walsh | |
| 6,321,264 B1 | 11/2001 | Fletcher | |
| 6,651,101 B1 | 11/2003 | Gai | |
| 6,678,835 B1 * | 1/2004 | Shah et al. ...................... | 714/4 |
| 6,816,455 B2 | 11/2004 | Goldberg et al. | |
| 6,836,462 B1 | 12/2004 | Albert | |
| 6,850,521 B1 * | 2/2005 | Kadambi et al. ............ | 370/389 |
| 6,907,036 B1 * | 6/2005 | Malalur ...................... | 370/382 |
| 6,957,258 B2 | 10/2005 | Maher | |
| 7,082,102 B1 | 7/2006 | Wright | |
| 7,143,006 B2 | 11/2006 | Ma | |
| 7,299,296 B1 * | 11/2007 | Lo et al. ...................... | 709/238 |
| 7,444,422 B1 * | 10/2008 | Li .............................. | 709/238 |
| 2005/0025064 A1 | 2/2005 | Chang | |
| 2005/0030952 A1 | 2/2005 | Elmasry | |
| 2005/0213504 A1 | 9/2005 | Enomoto | |
| 2006/0029104 A1 | 2/2006 | Jungck | |
| 2006/0048218 A1 | 3/2006 | Lingafelt | |
| 2006/0133377 A1 | 6/2006 | Jain | |

OTHER PUBLICATIONS

Gubbins, E., "*Extreme Unveils New 10-Gb/s Switch*," Telephony Online, Dec. 8, 2003, available at: http://telephonyonline.com/broadband/web/telecom_extreme_unveils_new/index.html#top.
Hochmuth, P., "*Extreme Switch Hits 10G, Adds Mgmt.*," Network World Fusion, Dec. 8, 2003, available at: http://www.nwfusion.com/news/2003/120810g.html.
Musich, P., "*Extreme Networks Releases Black Diamond 10 Gigabit Ethernet Switch*," eWeek Enterprise News & Reviews, Dec. 8, 2003, available at: http://wvvw.eweek.com/article2/0,1759,1517396,00.asp.

(Continued)

*Primary Examiner*—Patrice Winder
*Assistant Examiner*—Asghar Bilgrami
(74) *Attorney, Agent, or Firm*—Howrey LLP (57) ABSTRACT

One or more rules for performing one or more network switch functions, the one or more rules conforming to an improved rule structure, are provided. The improved rule structure comprises a first specification defining one or more conditions to be met, the one or more conditions comprising or including one or more conditions to be met by one or more usage-derived packet statistics, and a second specification defining one or more actions to be taken by the network switch if the one or more specified conditions are met.

65 Claims, 3 Drawing Sheets

OTHER PUBLICATIONS

Potter, D. and Sloane, T., "*New Product: BlackDiamond 10K—Industry's First Extensible Switching Platform*," Extreme Networks Power Point Slides, pp. 1-16, Dec. 8, 2003.

Sweeney, T., "*Protected by the Network Gear*," Network World Fusion, Mar. 22, 2004, *available at*: http://www.nwfusion.com/supp/2004/ndc2/0322netinfra.html.

Telecommunications Online, "*Product of the Month—Extreme Networks Launches Extensible Ethernet Switching Platform*," Feb. 2004, *available at*: http://www.telecommagazine.com/default.asp?journalid=3&func=departments&page=0401t07&year=2004&month=2.

Wirbel, L., "*Extreme Enters 10-Gbit Switch Arena*," EE Times Online, Dec. 15, 2003, *available at*: http://www.eetimes.com/story/OEG20031215S0053.

Office Action of U.S. Appl. No. 11/116,949, dated Aug. 18, 2009.

\* cited by examiner

RULE STRUCTURE FOR PERFORMING NETWORK SWITCH FUNCTIONS

RELATED APPLICATION(S)

This application is related to U.S. patent application Ser. No. 11/116,949, filed Apr. 27, 2009, entitled "Integrated Methods of Performing Network Switch Functions," which is filed concurrently herewith on the same date, and is incorporated herein by reference.

BACKGROUND

1. Field of the Invention

This invention relates generally to the fields of on-switch methods of performing various network functions, including detecting and mitigating network anomalies, performing packet filtering, enforcing network policies and the like, embodied in the form of rules such as Access Control Lists stored locally at the switch, and, more specifically, to improvements in the structure of such rules to allow more dynamic and flexible control and performance of the various network functions.

2. Related Art

In response to the onset of network attacks, viruses, and other network anomalies, network administrators presently utilize relatively static rules known as Access Control Lists (ACLs) to detect and mitigate the problem. These ACLs define a profile of potentially problematic network packets (typically in the form of an n-tuple specifying layer 2 source and destination addresses, layer 3 (IP) source and destination addresses, layer 4 protocol (TCP/UDP), and layer 4 source and destination ports), and one or more predetermined actions (such as denying or permitting packet access) to be taken by the network switch should a packet meeting this profile be encountered. Once defined, these ACLs are then compiled into executable form and executed within the network switch as packets are received or transmitted over the network. When a packet meeting the defined profile is received or transmitted over the network, the one or more predetermined actions defined by the rule are performed.

A problem with current ACLs is that, as the specified matching conditions are limited to conditions involving data in the packet or packet header, they are often insufficiently precise for the purpose of detecting or defending against network anomalies that are defined in other terms. Consider, for example, the following ACL, which always denies access to ICMP echo requests from a particular subnet (10.203.134.0/24), for the purpose of detecting and mitigating packet flooding of the network by this particular form of packet:

```
entry icmp {
  IF {
    source-address 10.203.134.0/24;
    protocol icmp;
    icmp-type echo-request;
  } THEN {
    deny;
  }
}
```

As this ACL always denies access whenever an ICMP echo request from the particular subnet (10.203.134.0/24) is encountered, even when a flooding condition is not present, it will often result in the denial of valid packets.

A related problem is that, as the response defined by this ACL is static, it cannot dynamically respond to a change in network conditions. For example, assuming the foregoing ACL is initially (and correctly) triggered upon the onset of a packet flooding condition from this particular form of packet, the ACL continues to deny access to these packets even after the network flooding condition has abated.

A third problem is that the limited functions that are allowed should a match condition be detected, such as allowing or denying access to packets meeting the specified profile, or mirroring the packets to a network administrator, are often not effective for the purpose of mitigating the network anomaly.

Consider, for example, an ACL that mirrors potentially problematic packets to a network administrator who is charged with the responsibility of examining the packets and taking appropriate action, such as by applying one or more new ACLs to deny access to these packets. Because of the latency between the time the potentially problematic packets are detected and the time of a response, significant damage to the network may have already occurred by the time of the response.

Therefore, there is a need for a more precise, flexible and dynamic rule structure for the purpose of detecting and responding to network anomalies.

SUMMARY

The invention provides one or more processor readable media tangibly embodying one or more rules for performing one or more network switch functions, one or more of the rules conforming to an improved rule structure having a first specification and a second specification. The first specification defines one or more conditions comprising or including one or more conditions to be met by one or more usage-derived packet statistics, i.e., a statistic derived from usage of the packet, such as a cumulative count of packets or packet bytes received at or transmitted from the switch that meet a packet profile, the rate at which such packets or packet bytes are received or transmitted, a ratio of such rates and the like. The second specification defines one or more actions to be taken by the network switch if the one or more specified conditions are met, i.e., packet mirroring, packet redirection, switch reconfiguration, trap notification, message logging, rule reconfiguration and the like.

Compared to conventional ACLs, where matching conditions are defined in terms of packet profiles alone, and where the defined responses are fixed and static, the improved rule structure allows for greater precision and dynamism in detecting and mitigating network anomalies as matching conditions can now be specified in term of usage-derived packet statistics as well as packet profiles, and the defined response can be dynamically changed in response to these usage-derived statistics.

The invention also provides a system for performing one or more network switch functions. The system has one or more processor readable media tangibly embodying one or more rules, one or more of these rules conforming to the improved rule structure described above, and one or processors for accessing the one or more rules from the processor readable medium and executing them so as to perform the one or more network switch functions.

The invention further provides a method of performing one or more network switch functions. In this method, there are three or more steps. In the first step, one or more usage-derived packet statistics are updated. In the second step, a determination is made whether one or more conditions are met, the one or more conditions comprising or including one or more conditions based on the one or more usage-derived packet statistics. In the third step, if the one or more conditions are met, one or more actions are performed.

Other systems, media, products, devices, methods, features and advantages of the invention will be or will become apparent to one with skill in the art upon examination of the following figures and detailed description. It is intended that all such additional systems, media, products, devices, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% should be considered to be explicitly within the scope of the stated value.

As used herein, the term "software" includes source code, assembly language code, binary code, firmware, macro-instructions, micro-instructions, rules such as ACLs for performing one or more network switch functions, or the like, or any combination of two or more of the foregoing.

The terms "processor readable media" or "processor readable medium" refer to any one or more media capable of holding software accessible by a processor, including but not limited to RAM, ROM, EPROM, PROM, EEPROM, disk, floppy disk, hard disk, CD-ROM, DVD, or the like, or any combination of two or more of the foregoing.

The term "processor" refers to any device capable of executing one or more software instructions and includes, without limitation, a general- or special-purpose microprocessor, finite state machine, controller, computer, digital signal processor (DSP), or the like.

The term "logic" refers to implementations in hardware, software, or combinations of hardware and software.

The term "ASIC" refers to an application specific integrated circuit.

The term "usage-derived packet statistic" refers to any statistic derived from usage of a packet within a network. Examples include a cumulative count of packets meeting a certain profile received at or transmitted from a network switch, a cumulative count of packet bytes from packets meeting a certain profile received at or transmitted from a network switch, the rate at which such packets or packet bytes are received at or transmitted from a network switch, a ratio of such rates, or the like.

Figure 1:
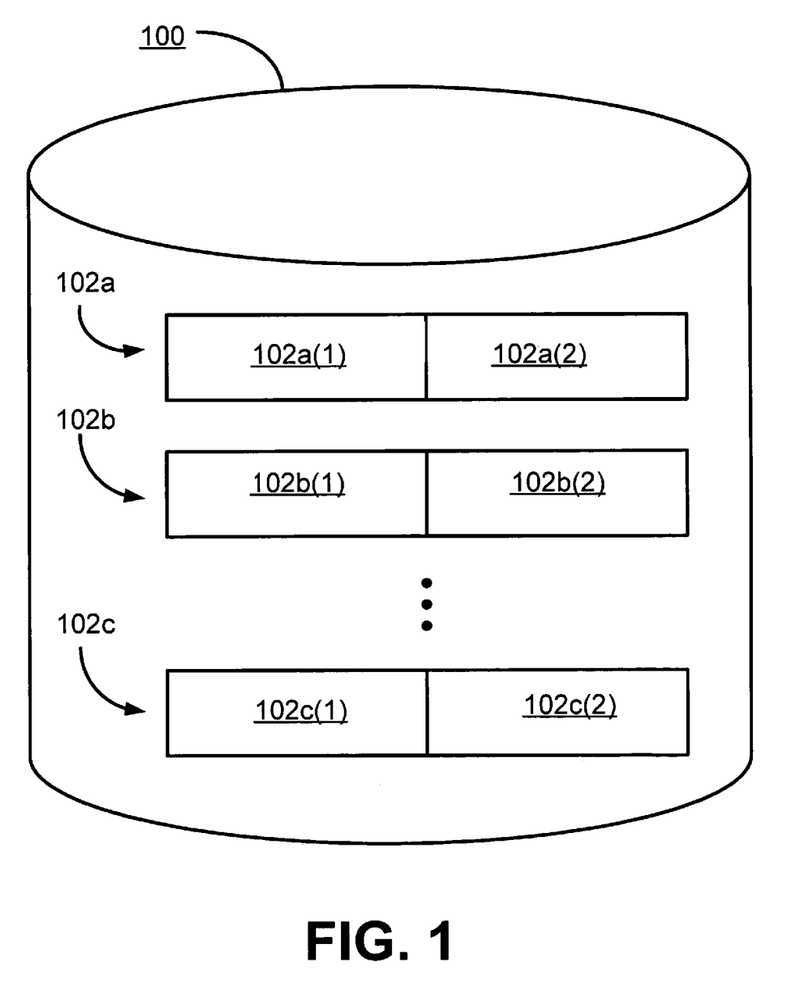
FIG. 1 illustrates one or more processor readable media holding one or more rules, one or more of which conform to an improved rule structure for performing one or more network switch functions.

FIG. 1 illustrates a first embodiment of one or more processor readable media 100 holding one or more rules 102a, 102b, 102c, one or more of which conform to an improved rule structure for performing one or more network switch functions. This improved rule structure comprises a first specification 102a(1), 102b(1), 102c(1) defining one or more conditions, the one or more conditions comprising or including one or more conditions to be met by one or more usage-derived packet statistics, and a second specification 102a(2), 102b(2), 102c(2) defining one or more actions to be taken by the network switch if the one or more conditions are met.

In one implementation, the one or more rules are software rules, one or more of which conform to a rule structure that may be represented by one or more IF THEN ELSE statements having the form:

IF {one or more conditions are met};
THEN {one or more actions to be taken if one or more conditions are met);
ELSE {one or more actions to be taken if one or more conditions unmet}.

In this implementation, the first specification is within the IF clause and defines the one or more conditions that are to be met, and the second specification is within the THEN clause and defines the one or more actions to be taken if the one or more conditions defined by the first specification are met. In addition, a third specification within the ELSE clause defines the one or more actions to be taken if the one or more conditions defined by the first specification are unmet.

In a second implementation, the one or more rules 102a, 102b, and 102c build on and extend other rules based on matching conditions defined in terms of matching packet profiles, including matching data in the packet header. The following example illustrates such a rule, rule1, for incrementing a counter, counter1, when a packet destined for a particular subnet (having address 192.168.16.0/24 and port 2049) is encountered. This is followed by a second rule, rule2, that denies access by these packets to the network switch if the contents of counter1 exceed a threshold of 1,000,000:

```
entry rule1 {
IF {
   destination-address 192.168.16.0/24;
   destination-port 2049;
}
   THEN {count counter1}
entry rule2 {
IF {count counter1>1000000}
   THEN {deny rule1}
```

In one example of this second implementation, the rules based on matching packet profiles are software rules having the following format:

```
entry {<rule-name>} {
IF {
<match conditions>
}
THEN {
<action>;
<action-modifers>;
}
}
``` where <rule-name> is the name of the rule, and one or more of the specified <match conditions> involve data within the packet or packet header, such as but not limited to the following:

IP source address
IP destination address
IP protocol
IP TOS bits
a flag indicating whether the packet is fragmented
TCP or UDP source port
TCP or UDP destination port
TCP flags
IGMP message type
IGMP type
IGMP code
Ethernet packet type
Ethernet source MAC address
Ethernet destination MAC address In this particular example, a "prefix" operator can be used to specify a match condition based on a prefix of a specified packet field rather than the entirety of the field, e.g., a prefix of the IP source and destination addresses, rather than the entirety of these addresses; a "number" operator can be used to define a match condition based on a packet field being equal to a particular numerical value, e.g., TCP or UDP source or destination port numbers being equal to a specified value; a "range" operator can be used to specify a match condition based on a packet field being within a range of numerical values; a "bit-field" operator can be used to define a match condition based on specific packet bits being equal to a particular value, e.g., TCP flags being equal to a particular value; and a "MAC-address" operator can be used to define a match condition based on the Ethernet source or destination (MAC) address of the packet.

Also in this particular example, the match conditions may involve one or more logical conditions such as == (equal to), != (not equal to), > (greater than), >= (greater than or equal to), < (less than), and <= (less than or equal to).

The <action> that may be specified includes "permit," indicating that the packet is to be accepted and forwarded to its final destination, or "deny," indicating that the packet is to be dropped and not further processed The <action-modifiers> that may be specified include 1) count <countername>, which indicates that a packet count of packets meeting the specified profile is maintained in <countername>, and is to be incremented when a packet meeting the specified profile is received at the one or more ports to which the rule is applicable or transmitted from one or more ports to which the rule is applicable; 2) qosprofile <QosProfileName>, which indicates that packets meeting the specified profile are to be assigned the specified QoS profile; and 3) Sample <N>, which indicates that incoming packets are to be statistically sampled by sending every Nth packet to a CPU or other processor accessible by a network administrator.

In this second implementation, the rules based on satisfying one or more usage-derived packet statistics are diverse. An example of this latter type of rule is a rule that specifies one or more actions to be taken if a cumulative packet count, equal to the cumulative count of a particular type of packet received at one or more ingress ports or VLANs or transmitted from one or more egress ports or VLANs, equals, is not equal to, exceeds, equals or exceeds, is less than, or is less than or equal to, a certain threshold value. The following illustrates the format of such a rule:

entry <rulename> {
    IF {count <counterName> REL_OPER <countThreshold>;
    period {interval};
    hysteresis {hysteresis};
    }
    THEN {
        <actionListIf>;
    } ELSE {
        {actionListElse};
    }
    } where
    <ruleName> is the rule name;
    <counterName> is the name of a counter from which the cumulative packet count is obtained;
    <counterThreshold> is the threshold that is compared to the counter contents;
    REL_OPER is a relational operator, i.e., ==, !=, >, >=, <, or <=;
    {interval} is an optional evaluation interval in seconds defining the time period over which the execution of the rule is repeated. For example, a value of 10 specifies that, every 10 seconds, the cumulative packet count (represented by the contents of <counterName>) are compared with the indicated threshold. If not specified, either a default value may be used or the execution of the rule performed once;
    {hysteresis} is an optional hysteresis value. Once the logical expression within the IF statement is true, the new threshold is adjusted with the hysteresis value. For > and >= expressions, the new threshold becomes (<countThreshold>−{hysteresis}). For < and <= expressions, the new threshold becomes (<countThreshold>+{hysteresis}). If {hysteresis} is greater than <countThreshold>, {hysteresis} is set to zero;
    <actionListIf> is a list of one or more actions to be performed if the logical expression forming the subject of the IF statement is logically true; and
    <actionListElse> is an optional list of one or more actions to be performed if the logical expression forming the subject of the IF statement is logically false.

In the following example of this particular rule format, the counter counter1 is incremented whenever a packet destined for a particular subnet (destination address 192.168.16.0/24, port 2049) is received (or transmitted). The contents of the counter are evaluated every 10 seconds. If the value of counter1 is greater than 1,000,000 packets, a trap or trap message is sent to the snmp server to alert the network administrator, and the packets are denied access to the network switch.

entry rule1 {
    IF {
        destination-address 192.168.16.0/24;
        destination-port 2049;
        protocol tcp;
    } THEN {
        count counter1;
    }
    }
    entry count_rule_example {
    IF {count counter1>1000000;
        period 10;
    }
    THEN {
        snmptrap 123 "Traffic on rule1 exceeds threshold"; # Send a single trap
        deny rule1; # Action converts the rule rule1 to a "deny" rule.
    }
    }

Another example is a rule that specifies one or more actions to be taken if a packet rate, equal to the rate at which a particular packet type is received at one or more ingress ports or VLANs, equals or transmitted from one or more egress ports or VLANs, is not equal to, exceeds, equals or exceeds, is less than, or is less than or equal to, a certain threshold value. The following illustrates the format of such a rule:

```
entry <rulename>{
  IF {delta <counterName> REL_OPER <countThreshold>;
  period {interval};
  hysteresis {hysteresis};
  }
  THEN {
    <actionListIf>;
  } ELSE {
    {actionListElse};
  }
}
``` where

<ruleName> is the rule name;

<counterName> is the name of a counter from which the change in cumulative packet count is derived since the last execution of the rule;

<counterThreshold> is the threshold that is compared to the change in counter contents;

REL_OPER is a relational operator, i.e., ==, !=, >, >=, <, or <=;

{interval} is an optional evaluation interval in seconds defining the time period over which the execution of the rule is repeated. For example, a value of 10 specifies that, every 10 seconds, the change in the cumulative packet count (represented by change in the contents of <counterName> since the last execution of the rule) is compared with the indicated threshold. If not specified, either a default value may be used or the execution of the rule performed once;

{hysteresis} is an optional hysteresis value. Once the logical expression within the IF statement is true, the new threshold is adjusted with the hysteresis value. For > and >= expressions, the new threshold becomes (<countThreshold>−{hysteresis}). For < and <= expressions, the new threshold becomes (<countThreshold>+{hysteresis}). If {hysteresis} is greater than <countThreshold>, {hysteresis} is set to zero;

<actionListIf> is a list of one or more actions to be performed if the logical expression forming the subject of the IF statement is logically true; and <actionListElse> is an optional list of one or more actions to be performed if the logical expression forming the subject of the IF statement is logically false.

In the following example of this particular rule format, the counter counter1 is incremented whenever a packet destined for a particular subnet (destination address 192.168.16.0/24, port 2049, protocol TCP) is encountered (received or transmitted). The contents are the counter are evaluated every 10 seconds. If the delta (change) of the counter1 value over the last 10 seconds is greater or equal than 1,000 packets, a trap message is sent to the snmp server to alert the network administrator, and the QoS profile assigned to the packets is changed to reflect a lower priority status. If the delta value continues to exceed 1,000 packets, a trap message is sent to the snmp server every 120 seconds. Once the delta value falls below 1,000 packets, another message is to the snmp server indicating this, and the QoS profile assigned to the packets is restored to reflect the original priority status.

```
entryrule1 {
  IF {
    destination-address 192.168.16.0/24;
    destination-port 2049;
    protocol tcp;
  } THEN {
    count counter1;
  }
}
entry delta_rule_example {
  IF {delta counter1>=1000; }
    THEN {
      snmptrap 123 "Traffic to 192.168.16.0/24 exceed rate limit" 120; # One every 120 seconds
      qosprofile rule1 QP3; # Move traffic to QP3
    } ELSE {
      snmptrap 123 "Traffic to 192.168.16.0/24 falls below rate limit";
      qosprofile rule1 QP1; # restore traffic to default qos profile
    }
}
```

A third example is a rule that specifies one or more actions to be taken if a ratio of cumulative packet counts, each comprising a cumulative count at which a particular type of packet is received at one or more ingress ports or VLANs or transmitted from one or more egress ports or VLANs, equals, does not equal to, exceeds, equals or exceeds, is less than, or is less than or equal to, a certain threshold value. The following illustrates a possible format of such a rule:

```
entry <rulename> {
  IF   {ratio   <counterNameA>   <counterNameB>
    REL_OPER .countThreshold>;
  period {interval};
  min-value {min-value};
  hysteresis {hysteresis};
  }
  THEN }
    <actionListIf>;
  } ELSE {
    {actionListElse};
  }
}
``` where

<ruleName> is the rule name;

<counterNameA> is the name of a counter from which the cumulative count of packet type A is obtained since the last execution of the rule. The cumulative count of packet type A forms the dividend of the ratio;

<counterNameB> is the name of a counter from which the cumulative count of packet type B is obtained since the last execution of the rule. The cumulative count of packet type B forms the divisor of the ratio;

<counterThreshold> is the threshold that is compared to the ratio (contents of counter A divided by the contents of counter B);

REL_OPER is a relational operator, i.e., ==, !=, >, >=, <, or <=;

{interval} is an optional evaluation interval in seconds defining the time period over which the execution of the rule is repeated. For example, a value of 10 specifies that, every 10 seconds, the rule is executed by comparing the ratio of the contents of <counterNameA> and the contents of <counterNameB> with the indicated threshold;

{min-value} is an optional minimum value of both the counter A and B contents before these values are considered valid. If either the counter A or counter B values, forming the dividend and divisor, respectively, is below the specified minimum value, the logical expression forming the subject of the IF statement is declared logically false. If not specified, a default value may be used;

{hysteresis} is an optional hysteresis value. Once the logical expression within the IF statement is true, the new threshold is adjusted with the hysteresis value. For > and >= expressions, the new threshold becomes (<countThreshold>-{hysteresis}). For < and <= expressions, the new threshold becomes (<countThreshold>+{hysteresis}). If {hysteresis} is greater than <countThreshold>, {hysteresis} is set to zero;

<actionListIf> is a list of one or more actions to be performed if the logical expression forming the subject of the IF statement is logically true; and <actionListElse> is an optional list of one or more actions to be performed if the logical expression forming the subject of the IF statement is logically false.

In the following example of this particular rule format, the counter counter1 is incremented whenever a UDP packet is encountered, and the counter counter2 is incremented whenever a TCP packet is encountered. The counter1 and counter2 values are evaluated every 2 seconds. If both counter values exceed the minimum valid threshold of 1,000, and the ratio of counter1 to counter2 exceeds 5, a message is logged to the message server alerting the network administrator to the situation. In the message string, the $ruleName, $ruleValue, and $ruleThreshold keywords are variables that are replaced with the actual values when the message is logged. Otherwise, no action is performed.

```
entry rule1 {
IF {
   protocol udp;
}THEN {
   count counter1;
}
}
entry rule2 {
IF {
   protocol tcp;
} THEN {
   count counter2;
}
}
entry ratio_rule_example {
IF {ratio counter1 counter2>5;
   period 2;
   min-value 1000;
}
THEN {
   syslog "Rule $ruleName threshold ratio $ruleValue
      exceeds limit $ruleThreshold" INFO;
}
}
```

A fourth example is a rule that specifies one or more actions to be taken if a ratio of packet rates, each comprising a rate at which a particular type of packet is received at one or more ingress ports or VLANs or transmitted from one or more egress ports or VLANs, exceeds, equals or exceeds, is equal to, not equal to, less than, or is less than or equal to, a certain threshold value. The following illustrates a possible format of such a rule:

```
entry <rulename>{
IF   {delta-ratio <counterNameA>   <counterNameB>
   REL_OPER .countThreshold>;
period {interval};
min-value {min-value};
hysteresis {hysteresis};
}
THEN {
   <actionListIf>;
} ELSE {
   {actionListElse};
}
}
``` where

<ruleName> is the rule name;

<counterNameA> is the name of a counter from which the change in packet count of packet type A is obtained since the last execution of the rule. The change in packet count of packet type A forms the dividend of the ratio;

<counterNameB> is the name of a counter from which the change in packet count of packet type B is obtained since the last execution of the rule. The change in packet count of packet type B forms the divisor of the ratio;

<counterThreshold> is the threshold that is compared to the ratio (change in contents of counter A divided by the change in contents of counter B);

REL_OPER is a relational operator, i.e., ==, !=, >, >=, <, or <=;

{interval} is an optional evaluation interval in seconds defining the time period over which the execution of the rule is repeated. For example, a value of 10 specifies that, every 10 seconds, the rule is executed by comparing the ratio of the change in contents of <counterNameA> and the change in contents of <counterNameB> with the indicated threshold;

{min-value} is an optional minimum value of both the change in counter A and B contents before these values are considered valid. If the change in the contents of either the counter A or counter B values, forming the dividend and divisor, respectively, is below the specified minimum value, the logical expression forming the subject of the IF statement is declared logically false. If not specified, a default value may be used;

{hysteresis} is an optional hysteresis value. Once the logical expression within the IF statement is true, the new threshold is adjusted with the hysteresis value. For > and >= expressions, the new threshold becomes (<countThreshold>-{hysteresis}). For < and <= expressions, the new threshold becomes (<countThreshold>+{hysteresis}). If {hysteresis} is greater than <countThreshold>, {hysteresis} is set to zero;

<actionListIf> is a list of one or more actions to be performed if the logical expression forming the subject of the IF statement is logically true; and <actionListElse> is an optional list of one or more actions to be performed if the logical expression forming the subject of the IF statement is logically false.

In the following example of this particular rule format, the tcpSynCounter is incremented whenever a TCP SYN packet is encountered, and tcpCounter values is incremented whenever a general TCP packet is encountered. Both counters are evaluated every 2 seconds. At that time, the change (delta) in each counter over the previous 2 seconds is computed. If both counter values exceed the minimum valid threshold of 100, and the ratio of the change in tcpSynCounter to that in tcpCounter exceeds 10, indicating the onset of a TCP SYN Flood, then a warning message is logged onto the message server (after the variable $port is replaced with its actual value), and all SYN traffic is denied access to the specified switch port. As no "period" value for the syslog message is specified, the message is only logged once. If the ratio of the change in the two counters subsequently falls below 10 (the ratio must fall below 8 because a hysteresis value of 2 is specified), another message is logged (again after making the variable substitution) indicating this, and access to the specified port by SYN traffic re-enabled.

```
entry syn {
IF {
```

```
    tcp_flags SYN;
} THEN {
    count tcpSynCounter;
}
}
entry tcp {
IF {
    protocol tcp;
}THEN {
    count tcpCounter;
}
}
entry delta_ratio_rule_example {
IF {delta-ratio tcpSynCounter tcpCounter>10;
    period 2;
    min-value 100;
    hysteresis 2;
}
THEN {
    syslog "Syn attack on port $port is detected" WARN;
    deny syn;
} ELSE {
    syslog "Syn attack on port $port is no longer detected"
        WARN;
    permit syn;
}
}
```

A fifth example is a rule that specifies one or more actions to be taken if a "true" count from another rule, i.e., a count of the number of logical condition(s) specified in the IF portion of the other rule that are satisfied, equals, is not equal to, exceeds, equals or exceeds, is less than, or is less than or equal to, a certain threshold value. The following illustrates a possible format of such a rule:

```
    entry <rulename> {
    IF {rule-true-count <name> REL_OPER <countThresh-
        old>;
    }
    THEN {
        <actionListIf>;
    } ELSE {
        {actionListElse};
    }
    }
``` where
    <ruleName> is the rule name;
    <name> is the name of a previous rule;
    <counterThreshold> is the threshold that is compared to the true count from the previous rule;
    REL_OPER is a relational operator, i.e., ==, !=, >, >=, <, or <=;
    <actionListIf> is a list of one or more actions to be performed if the logical expression forming the subject of the IF statement is logically true; and
    <actionListElse> is an optional list of one or more actions to be performed if the logical expression forming the subject of the IF statement is logically false.

And example of this particular rule is as follows:

```
    entry rule1 {
    IF {count counter1>10000;
        count counter2>10000;
        count counter3>10000;
        count counter4>10000;
    }
    THEN {
        ;
```
```
    }
    }
    entry rule2 {
    IF {count counter5>10000;
        count counter4>10000;
        rule-true-count rule1>=1;
    }
    THEN {
        ;
    }
    }
```

Note that this rule, rule2, is equivalent to the following:
```
    IF {
    counter1>10000;
    counter2>10000;
    counter3>10000;
    counter4>10000;
    counter5>10000;
    counter6>10000
    }
    THEN {
        ;
    }
```

The one or more actions that may be taken within either the THEN or ELSE portions of the foregoing rules are diverse, and include either starting or stopping packet mirroring to a port accessible by a network administrator. In one implementation, such actions may be specified by the following syntax:
    mirror [add/delete] <RuleName> where "add" specifies that mirroring is to be started while "delete" indicates it is to be stopped, and <RuleName> identifies the rule that defines the profile of the packets that are to be mirrored or not. For example, the command "mirror add rule1" mirrors packets having the packet profile defined by rule1, while the command "mirror delete rule2" turns off mirroring of packets having the packet profile defined by rule2.

The one or more actions may also include starting or stopping redirecting packets to a port accessible by a network administrator.

These actions may further include reconfiguring the switch, such as by disabling one or more ports or deleting one or more ports from a VLAN. In one implementation, such actions are specified using a command line interface (CLI) command having the following syntax:
    cli <cliCommand> where <cliCommand> is a CLI command such as the following "configure" command:
    configure access-list <ruleName>{ports <portlist>|vlan <vlanName>|any} {direction}

This command applies the identified rule <ruleName> to the ports of the switch identified in <portlist>, to the VLAN specified by <vlanName>, or all ports of the switch if the term "any" is present. The value <direction> indicates whether the rule is to be applied to ingress ports or VLANs, or egress ports or VLANs. If neither is specified, the default value {ingress} is assumed.

Another example is the following "unconfigure" command:
    unconfigure access-list <ruleName>{ports <portlist>|vlan <vlanName>|any} {direction} which removes application of the rule <ruleName> from the ports identified in <portlist>, the VLAN identified by <vlanName>, or all ports if the term "any" is specified. The value <direction> specifies whether application of the rule is removed from ingress ports or VLANs, or egress ports or VLANs. If neither is specified, the default value {ingress} is assumed.

A third example is the following "refresh" command:
   refresh policy <ruleName> which "refreshes" the indicated rule by resetting the contents of the counter specified by the rule to 0.

A fourth example is the following "configure mirroring add" command:
   configure mirroring add [port <port>|vlan <vlanName>]

which mirrors packets received at the identified ingress port(s) or VLAN.

A fifth example is the following global "add/delete mirroring" command:
   [disable|enable] mirror where "disable mirror" disables mirroring on a global basis, and "enable mirror" enables mirroring on a global basis.

A sixth example is the following "disable/enable ports" command:
   [disable|enable] ports <portlist> where "disable ports" disables the ports identified in <portList> and "enable ports" enables these ports.

The one or more actions may also include sending one or more trap messages to a trap server accessible by a network administrator, such as a SNMP trap server. An action such as this may be specified by the following syntax:
   snmptrap <id> <message> {period} which specifies periodically sending the specified message <message> to a SNMP server (along with the code <id>) at a periodicity of {period} seconds. If {period} is 0, the message is sent only once, and if {period} is not specified, a default value of 0 is assumed. For example, snmptrap 100 "TCP SYN flood attack is detected" 30 sends the specified message to the SNMP trap server every 30 seconds.

The one or more actions may also include logging one or more messages to a file or message server accessible by a network administrator. In one example, such an action is specified by the following syntax:
   syslog <message> <level> {period} which specifies periodically logging the specified message <message> to the message server at a periodicity of {period} seconds (which should be an integer multiple of {integer}, the periodicity of the underlying rule). If the value {period} is not specified, a default value of 0 is assumed, indicating that the message is logged only once. The string <level> is a priority indicator that can take on any of the following values: DEBU, INFO, NOTI, WARN, ERRO, or CRIT, where DEBU indicates the message string relates to a debugging operation; INFO, that the string is informational, NOTI, that the string is an important notification to the network administrator, WARN, that the message is a warning, ERRO, that an error has been encountered, and CRIT, that the condition of the network switch is critical.

In one implementation, the message strings of the messages that are sent to the trap server or logged to the message server may include one or more variables that are replaced by underlying data values when the actions are performed. For example, the variable $port in a message string is replaced by the current ingress port when the message is logged or sent. In one example, the following variables may be used within the message string:
   $policyName—replace with policy name
   $ruleName—replace with rule name
   $<counterName>—replace with contents of counter with indicated counter name <counterName>
   $ruleValue—replace with result, TRUE or FALSE, of logical expression associated with current rule
   $ruleThreshold—replace with the threshold associated with current rule
   $ruleInterval—replace with the sampling/evaluation interval of current rule
   $vlanName—replace with the VLAN name to which the policy is assigned
   $port—replace with the port where the policy is applied The one or more conditions (or any thresholds used in formulating these conditions) within the IF portion of a rule may also include any of the foregoing variables to allow rule triggering based on dynamically changing conditions within the network switch. Alternatively, the one or more conditions (or any thresholds therein) may be predetermined.

The one or more actions within either the THEN or ELSE portions of the rule may also include any of the foregoing variables to allow the actions to be taken if the logical conditions are satisfied or not to be dynamically changed based on network conditions. Alternatively, the one or more actions specified in either the THEN or ELSE portions of the rule may be predetermined.

The one or more actions may also include modifying one or more existing rules that are already applicable to the switch. In one example, actions such as this is specified by the following syntax:
   deny <ruleName>
   permit <ruleName> where "deny" changes the indicated rule <ruleName> so that packets meeting the packet profile defined in that rule are denied network access, while "permit" changes the indicated rule <ruleName> so that packets meeting the profile defined in that rule are permitted network access.

The one or more actions may also include applying one or more additional rules to the switch (using the previously discussed "configure" command for example).

They may further include changing the assigned QoS profile assigned to a particular packet. In one example, an action such as this is performed using the following syntax:
   qosprofile <ruleName> <QPx> which specified assigning packets meeting the profile defined in <ruleName> with the QoS value <QPx>.

The rule structure may also support a nesting feature, whereby individual rules may be nested together to define more complex triggering conditions. The following example illustrates a nested rule structure, whereby, among other conditions, rule3 is only triggered when the logical expression defined by the IF portion of rule2 is satisfied:

```
entry rule1 {
IF {
   destination-address 192.168.16.0/24;
   destination-port 2049;
}
   THEN {count counter1}
entry rule2 {
IF {count counter1>1000000}
   THEN {deny rule1}
entry rule3 {
IF {count counter1<2000000;
   rule2=TRUE;
   }
   THEN {
     permit rule1;
```

```
      mirror rule1;
    }
```

As the rules are executed sequentially, rule3 overrides rule2 by permitting access to those packets nominally subject to rule2 when the contents of counter1 is less than 2,000,000. The net result is that packets meeting the profile specified in rule1 are denied access if the cumulative number of these packets received at the switch is greater than or equal to 2,000,000, but, if the cumulative number of such packets received at the switch is greater than 1,000,000 but less than 2,000,000, the packets are permitted access (but mirrored to a network administrator).

The rule structure may also support "match any" and "match all" formats, which are formats designed to handle compound expressions. The "match any" format triggers a rule whenever any one of many logical conditions are satisfied, while the "match all" format triggers the rule only when all the logical conditions are satisfied. In the following example of the "match any" format, the rule is triggered if either the contents of <counter1> or <content2> exceeds 10,000:

```
    entry match any or_rule {
    IF {
       count counter1>10000;
       count counter2>10000;
    }
       THEN {one or more specified actions}
    }
```

In the following example of the "match all" format, however, the rule is triggered if the contents of <counter1> exceed 10,000 and the contents of <counter2> exceed 10,000:

```
    entry match all and_rule {
    IF {
       count counter1>10000;
       count counter2>10000;
    }
       THEN {one or more specified actions}
    }
```

In one example if neither format is specified, the "match all" format is assumed.

The rule structure may also support fractional thresholds, i.e., a threshold expressed as a fraction. The following example illustrates the use of a fractional threshold:

```
    entry fraction {
    IF {ratio counter1 counter2>1/1000;
    }
       THEN {
         <one or more specified actions>;
       }.
    }.
```

The rule structure may also support global rules, which are rules applicable to all interfaces, i.e., ports or VLANs, within a particular grouping known as a "policy." In the following example, a global rule, global_rule, is applied to all interfaces within a particular policy. The rule is designed to detect if there is a SYN attack at any of the ports within the policy. In this example, a SYN attack is defined as the condition where, over a 2 second period, the change in the number of SYN packets exceeds the change in the number of TCP packets by over a factor of 10. If a SYN attack is detected, a second rule, syn_attack, is applied to determine the specific port that is under attack:

```
    entry syn {
    IF {
       protocol tcp_flags SYN;
    } THEN {
       count tcpSynCounter;
    }
    }
    entry tcp {
    IF {
       protocol tcp;
    } THEN {
       count tcpCounter;
    }
    }
    entry global_rule {
    IF {delta-ratio tcpSynCounter tcpCounter>10
       global;
       period 2;
       min-value 100;
       hysteresis 2;
    }
       THEN {
         syslog "Syn attack is detected" WARN;
       }
    }
    entry syn_attack {
    IF {delta tcpSynCounter>1000;
       global_rule=TRUE; #Now we can find out which port is
          under attack
       period 2;
       hysteresis 2;
    }
       THEN {
         syslog "Syn attack on port $port is detected" WARN
            deny syn;
       } ELSE {
         syslog "Syn attack on port $port is no longer
            detected" WARN;
         permit syn;
       }
    }
```

The rule structure may also support a "byte" option, which allows counters that normally function as packet counters to also function as byte counters. The following example demonstrates the use of the byte option in a rule designed to detect the onset of a particular network attack characterized by large average size ping packets:

```
    entry icmp {
    IF {
       protocol icmp;
    } THEN {
       count PingCount;
    }
    }
    entry ping_of_death {
    IF {ratio-delta pingCount.byte pingCount>1000; #large
       size ping
    }
       THEN {
         <one or more specified actions>;
       }
    }
```

The rule structure may also support an "average" option, which allows averages to be taken over a defined sampling period. In the following example, through use of the "average" option, the rule specified one or more specified actions to be performed if the average change in the pingCount over 10 samples is greater than 2,000:

```
    entry icmp {
    IF {
```

```
    protocol icmp;
} THEN {
    count pingCount;
}
}
}
entry average {
IF {delta pingCount>2000;
average 10; # average for 10 samples
}
    THEN {
    <one or more specified actions>;
        }
}.
```

The rule structure may also support a "time" feature, whereby the time period during which one or more of the conditions must be satisfied may be specified. In the following example, this "time" feature is used to specify thresholds that vary depending on time of day, with a threshold of 1,000,000 applicable during business hours (9 AM-5 PM) and a threshold of 2,000,000 applicable outside of business hours:

```
    entryrule1 {
    IF {
        destination-address 192.168.16.0/24;
        destination-port 2049;
    }
        THEN {count counter1}
    entry rule2 {
    IF {
        count counter1>1000000;
        time within 9 AM and 5 PM;
    }
        THEN {deny rule1}
    entry rule3 {
    IF {
        count counter1>2000000;
        time outside 9 AM and 5 PM;
    }
        THEN {deny rule1}
```

Figure 2:
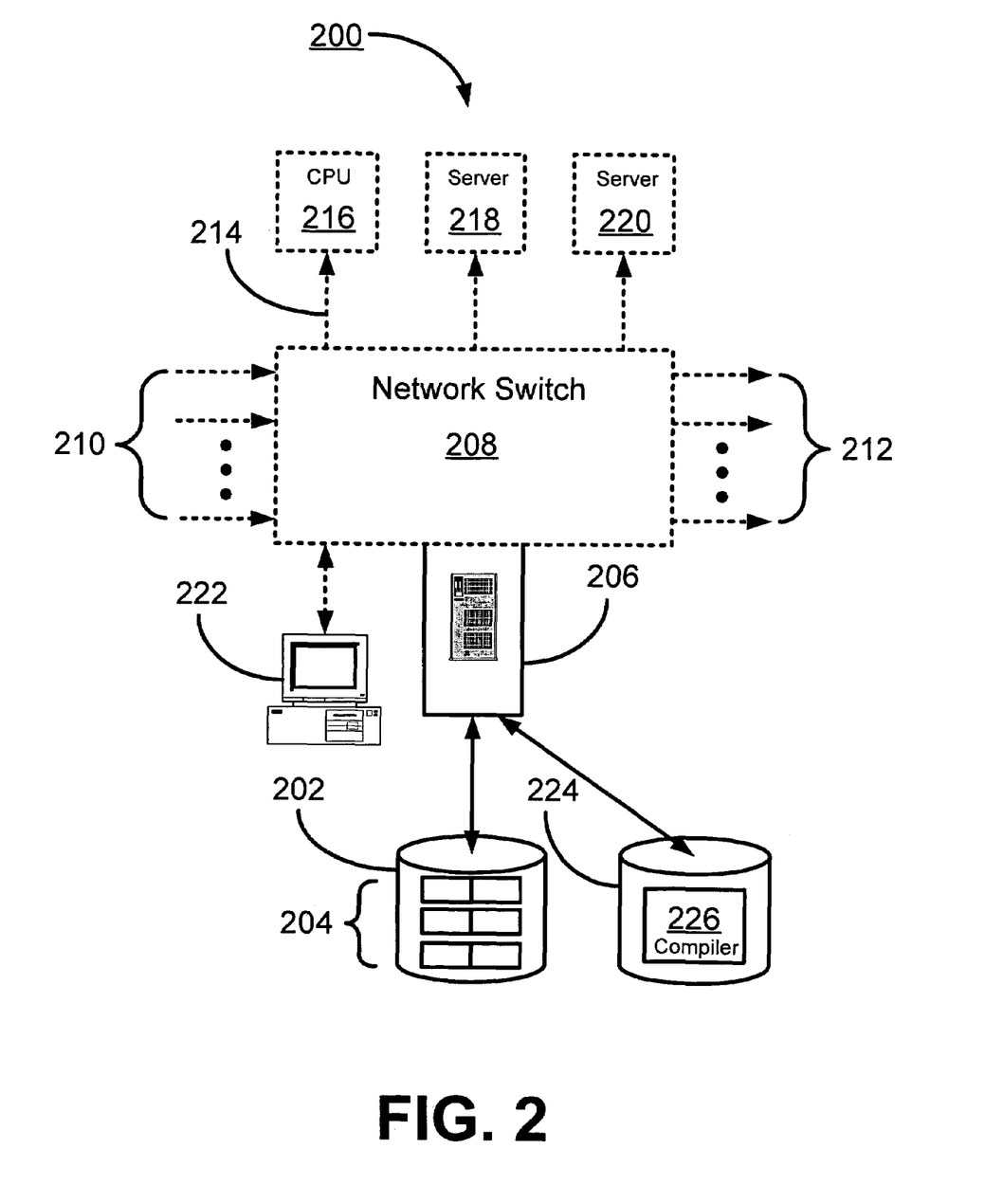
FIG. 2 is a block diagram of a system comprising the one or more processor readable media of FIG. 1 and one or more processors configured to access and execute the one or more rules held by the one or more processor readable media, thus performing the one or more network switch functions.

The one or more processor readable media 100 of FIG. 1 may also be included in a system. FIG. 2 illustrates an embodiment 200 of a system for performing one or more network switch functions by or for network switch 208. In this embodiment, the system comprises one or more processor readable media 202 tangibly embodying one or more rules 204 conforming to an improved rule structure of the type previously described in relation to FIG. 1. The system also comprises one or processors 206 for accessing the one or more rules 204 from the one or more processor readable media 202 and executing them so as to perform the one or more network switch functions. The network switch 208 has one or one ports of ingress 210 and one or more ports of egress 212. The network switch 208 is shown in phantom as it may or may not be part of the system.

In one implementation, the one or more processors 206 are configured to compile the one or more rules into executable form, and then execute the one or more rules as packets are received or transmitted to perform the one or more network switch functions. The rules may be executed once or more than once, although in practice, they will normally be executed on an ongoing basis as packets are received at or transmitted from the switch. In one implementation, the rules are executed periodically at the level of periodicity specified in the rules, which may differ amongst the rules.

In this implementation, the network administrator also specifies one or more ports a rule is applicable to (as well as the port direction, whether ingress or egress), one or more VLANs a rule is applicable to, or whether the rule is a wildcard rule applicable to all ports. In one approach, a network administrator employs the "configure" CLI command (discussed previously) to specify the ports a particular rule is applicable to, whether the ports are ingress or egress ports, the VLAN the rule is applicable to, or whether the rule is a wildcard rule applicable to all ports. To remove application of a rule from one or more ports or VLANs, the network administrator in this configuration employs the previously-discussed "unconfigure" CLI command.

In this implementation, a priority resolution scheme is employed to resolve conflicts between rules. In one example, the priority resolution scheme gives highest priority to rules applicable to specific ports, the next highest priority to rules applicable to specific VLANs, and the lowest priority to wildcard rules applicable to all ports. In this particular example, if a particular rule, rule1, is applied to port A that is part of VLAN B, and a second conflicting rule, rule 2, is applied to VLAN B, then rule1 will take priority over rule2 as to port A by rendering rule 2 inapplicable to port A.

In one configuration, the one or more processors 206 form at least a portion of or are integral with the network switch 208, while, in another, they are distinct from but coupled to the network switch 208. In one example, the one or more processors 206 are implemented as one or more ASICs.

In one embodiment, the network switch 208 includes one or more ports 214 accessible by a network administrator to which mirrored packets may be directed. In one implementation, the port 214 is coupled to a remote client or CPU 216 through which the network administrator gains access to the mirrored packets. In another implementation, the port 214 is a monitor port through which the network administrator may gain access to the mirrored packets.

In a second embodiment, the network switch 208 is coupled to a trap server 218 accessible by the network administrator to which traps and trap messages may be sent responsive to execution of the rules. In one example, the server 218 is a SNMP server for the receipt of SNMP traps and trap messages.

In a third embodiment, the network switch 208 is coupled to a server 220 for the receipt of messages logged to a file within the server in response to the execution of one or more rules. In one implementation, the server 220 is distinct from the server 218 while, in another implementation, the two are implemented as the same server.

In a fourth embodiment, the network switch 208 is also configured to a user interface 222 for the receipt (from a network administrator) of rules and CLI commands for applying the rules to specific ports or VLANs of the network switch. The user interface 222 may also be configured to display reports showing the status of the various rules, including reports illustrating which rules apply to which ports and VLANs.

In one configuration, the one or more processors 206 are coupled to one or more processor readable media 224 on which is stored a compiler 226 for compiling the rules 204 and putting them into executable form so that they may be executed by the one or more processors 206. In one approach, the one or more processor readable media 224 storing the compiler is distinct from that storing the one or more rules 204 (identified with numeral 202). In another approach, the two are the same medium.

Figure 3:
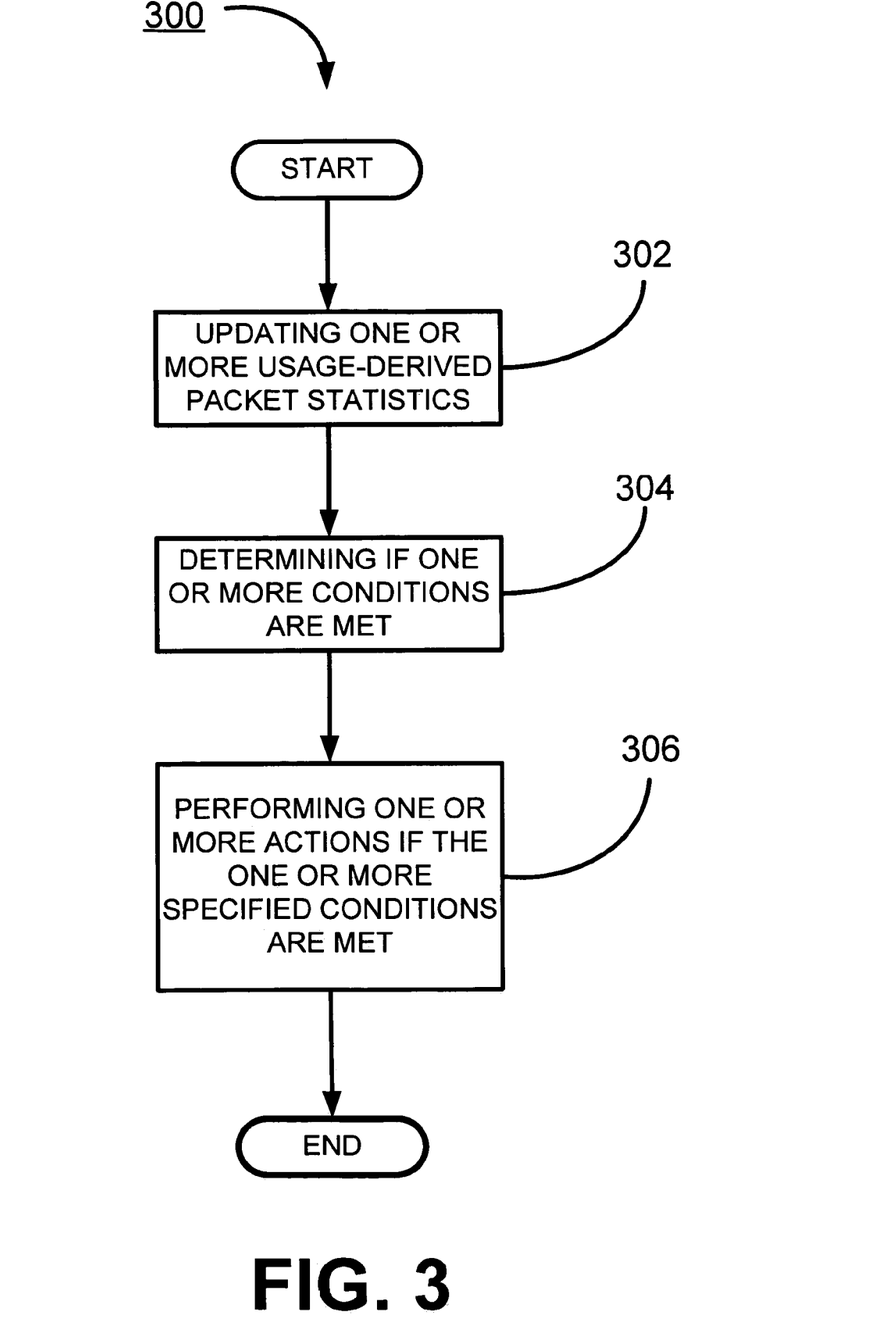
FIG. 3 is a flowchart of an embodiment of a method of performing one or more network switch functions embodied by the one or more rules of FIG. 1.

FIG. 3 is a flowchart of an embodiment 300 of a method of performing one or more network switch functions. The method 300 comprises steps 302, 304, and 306.

Step 302 comprises updating one or more usage-derived packet statistics responsive to receipt of the one or more packets.

Step 304 comprises determining if one or more conditions are met, the one or more conditions comprising or including one or more conditions based on the one or more external statistics.

Step 306 comprises performing one or more actions if the one or more conditions are met.

The method 300 may be performed by one or more processors that are distinct from (and coupled to) the network switch, or that form part of or are integral with the network switch. In one configuration, the one or more processors are implemented as one or more ASICs.

The usage-derived packet statistics may be any of the usage-derived packet statistics previously described in relation to FIG. 1.

For example, the one or more usage-derived packet statistics may comprise a count of packets that meet a particular packet profile received at one or more ingress ports or VLANs or transmitted from one or more egress ports or VLANs of the network switch.

The one or more usage-derived packet statistics may also comprise a rate at which a specified packet type is received at one or more ingress ports or VLANs or transmitted from one or more egress ports of VLANs of the network switch.

The one or more usage-derived packet statistics may further comprise a ratio of rates, each a rate at which a specified packet type is received at one or more ingress ports or VLANs or transmitted from one or more egress ports of VLANs of the network switch.

The one or more specified conditions may be nested.

The one or more conditions may also be programmable.

The one or more conditions (or any thresholds therein) may also be predetermined or they may be defined in terms of one or more variables (such as $port), allowing them to be dynamically changed.

The one or more actions may comprise any of the actions previously described in relation to FIG. 1, including mirroring one or more packets to a port accessible by a network administrator; redirecting one or more packets to a port accessible by a network administrator; reconfiguring the switch; sending one or more traps or trap messages to a server accessible by a network administrator; logging one or more messages to a file accessible by a network administrator; modifying one or more rules applicable to the network switch; and applying one or more additional rules to the network switch.

The one or more actions may be programmable.

The one or more actions may further be predetermined. Alternatively, the one or more actions may be defined in terms of one or more variables, allowing them to be dynamically changed.

In lieu of a software implementation, the rules may also be embodied in logic comprising hardware or a combination of hardware and software. In one implementation, first logic tangibly embodies one or more rules conforming to the previously described improved rule structure, and second logic executes the rules as packets are received at or transmitted by the network switch.

While various embodiments of the invention have been described, it will be apparent to those of ordinary skill in the art that many more embodiments and implementations are possible that are within the scope of this invention.

What is claimed is:

1. One or more processor readable media tangibly embodying one or more rules for performing one or more network switch functions by or for a network switch, the one or more rules conforming to an improved rule structure comprising:

a first specification specifying (1) a packet profile; (2) a counter having a contents that are updated when a packet having the specified profile is received at or transmitted from the network switch; (3) a usage-derived packet statistic derived from the counter contents; (4) one or more conditions to be met by the usage-derived packet statistic during a check of the usage-derived packet statistic; and (5) an interval of time after which a check of the usage-derived packet statistic is repeated one or more times, the repeated check determining whether the usage-derived packet statistic derived from then current counter contents meets the specified one or more conditions; and a second specification defining one or more actions to be taken by or for the network switch whenever the specified one or more conditions are determined to be met by the usage-derived packet statistic during any of the checks that are performed.

2. The one or more processor readable media of claim 1 wherein the improved rule structure is represented by one or more IF THEN statements or one or more IF THEN ELSE statements.

3. The one or more processor readable media of claim 2 wherein one or more of the IF THEN or IF THEN ELSE statements are nested.

4. The one or more processor readable media of claim 2 wherein at least a portion of the first specification is represented by the IF portion of an IF THEN or IF THEN ELSE statement.

5. The one or more processor readable media of claim 4 wherein the second specification is represented by the THEN portion of an IF THEN or IF THEN ELSE statement.

6. The one or more processor readable media of claim 1 wherein the usage-derived packet statistic comprises a count of packets meeting a particular packet profile that are received by or transmitted from one or more ports or VLANs.

7. The one or more processor readable media of claim 1 wherein the usage-derived packet statistic comprises a rate at which packets meeting a particular packet profile are received at one or more ingress ports or VLANs or transmitted from one or more egress ports or VLANs.

8. The one or more processor readable media of claim 1 wherein the usage-derived packet statistic comprises a ratio of rates, each comprising a rate at which packets meeting a particular packet profile are received at one or more ingress ports or VLANs or transmitted from one or more egress ports or VLANs.

9. The one or more processor readable media of claim 1 wherein the first specification specifies the time during which one or more of the conditions must be met.

10. The one or more processor readable media of claim 1 wherein the one or more actions comprise redirecting one or more packets to a port accessible by a network administrator.

11. The one or more processor readable media of claim 1 wherein the one or more actions comprise reconfiguring the switch.

12. The one or more processor readable media of claim 1 wherein the one or more actions comprise sending one or more traps or trap messages to a server accessible by a network administrator.

13. The one or more processor readable media of claim 1 wherein the one or more actions comprise logging one or more messages to a file accessible by a network administrator.

14. The one or more processor readable media of claim 1 wherein the one or more actions comprise modifying one or more existing rules applicable to the switch.

15. The one or more processor readable media of claim 1 wherein the one or more actions comprise applying one or more additional rules to the switch.

16. A system for performing one or more network switch functions by or for a network switch comprising:

one or more processor readable media tangibly embodying one or more rules conforming to an improved rule structure for performing one or more network switch functions, the improved rule structure comprising a first specification specifying (1) a packet profile; (2) a counter having a contents that are updated when a packet having the specified profile is received at or transmitted from the network switch; (3) a usage-derived packet statistic derived from the counter contents; (4) one or more conditions to be met by the usage-derived packet statistic during a check of the usage-derived packet statistic; and (5) an interval of time after which a check of the usage-derived packet statistic is repeated one or more times, the repeated check determining whether the usage-derived packet statistic derived from then current counter contents meets the specified one or more conditions; and a second specification defining one or more actions to be taken by or for the network switch whenever the specified one or more specified conditions are determined to be met by the usage-derived packet statistic during any of the checks that are performed; and one or processors for accessing the one or more rules from the one or more processor readable media and executing them so as to perform the one or more network switch functions.

17. The system of claim 16 wherein the one or more processors are configured to execute the one or more rules by first compiling them into executable form.

18. The system of claim 17 wherein the one or more processors are further configured to execute the compiled one or more rules.

19. The system of claim 16 wherein the one or more processors are configured to apply the one or more rules to one or more ports of the network switch.

20. The system of claim 19 wherein the one or more ports are specified by a network administrator.

21. The system of claim 16 wherein the one or more processors are configured to apply the one or more rules to one or more VLANs.

22. The system of claim 21 where the one or more VLANs are specified by a network administrator.

23. The system of claim 16 wherein the one or more processors form at least a portion of the network switch.

24. The system of claim 23 wherein the one or more processors are implemented as one or more ASICs.

25. The system of claim 16 further comprising the network switch.

26. The system of claim 25 wherein the network switch includes one or more ports accessible by a network administrator to which mirrored or redirected packets is sent responsive to execution of one or more rules.

27. The system of claim 25 wherein the network switch is coupled to a trap server accessible by a network administrator to which traps or trap messages are sent responsive to execution of one or more rules.

28. The system of claim 25 wherein the network switch is coupled to a message server accessible by a network administrator to which messages are logged responsive to execution of one or more rules.

29. The system of claim 16 wherein the one or more rules are periodically executed.

30. The system of claim 16 wherein the one or more rules are executed as packets are received at or transmitted from the switch.

31. A system for performing one or more network switch functions by or for a network switch comprising:

first means for tangibly embodying one or more rules conforming to an improved rule structure for performing one or more network switch functions, the improved rule structure comprising a first specification specifying (1) a packet profile; (2) a counter having a contents that are updated when a packet having the specified profile is received at or transmitted from the network switch; (3) a usage-derived packet statistic derived from the counter contents; (4) one or more conditions to be met by the usage-derived packet statistic during a check of the usage-derived packet statistic; and (5) an interval of time after which a check of the usage-derived packet statistic is repeated one or more times, the repeated check determining whether the usage-derived packet statistic derived from then current counter contents meets the specified one or more conditions; and a second specification of one or more actions to be taken by the network switch whenever the specified one or more conditions are determined to be met by the usage-derived packet statistic during any of the checks that are performed; and second means for accessing the one or more rules from the first means and executing them to perform the one or more network switch functions.

32. A method of performing one or more network switch functions by or for a network switch comprising executing software compiled from one or more rules conforming to an improved rule structure, the improved rule structure comprising a first specification specifying (1) a packet profile; (2) a counter having a contents; (3) a usage-derived packet statistic derived from the counter contents; (4) one or more conditions; and (5) an interval of time; and a second specification of one or more actions to be taken by the network switch, thereby performing the following method steps:

updating the contents of the counter when a packet having the specified packet profile is received at or transmitted by the network switch;

deriving the usage-derived packet statistic from the counter contents;

checking the usage-derived packet statistic by determining if the one or more conditions are met by the usage-based packet statistic;

repeating a check of the usage-derived packet statistic one or more times by determining, after the specified interval of time, for each such repeated check, whether the usage-derived packet statistic derived from then current counter contents meets the specified one or more conditions; and performing the specified one or more actions whenever the one or more conditions are determined to be met by the usage-derived packet statistic during any of the checks that are performed.

33. The method of claim 32 performed within or at a network switch.

34. The method of claim 32 wherein the one or more conditions are programmable.

35. The method of claim 32 wherein the one or more actions are programmable.

36. The method of claim 32 wherein the one or more conditions are predetermined.

37. The method of claim 32 wherein the one or more actions are predetermined.

38. The method of claim 32 wherein the one or more conditions are dynamically changed.

39. The method of claim 32 wherein the one or more conditions are defined in terms of one or more variables.

40. The method of claim 32 wherein the one or more actions are dynamically changed.

41. The method of claim 32 wherein the one or more actions are defined in terms of one or more variables.

42. The method of claim 32 wherein the usage-derived packet statistic comprises a count of a particular type of packet received at one or more ingress ports or VLANs of the network switch or transmitted from one or more egress ports or VLANs of the network switch.

43. The method of claim 32 wherein the usage-derived packet statistic comprises a rate at which a specified packet type is received at one or more ingress ports or VLANs or transmitted from one or more egress ports or VLANs of the network switch.

44. The method of claim 32 wherein the usage-derived packet statistic comprises a ratio of rates, each a rate at which a specified packet type is received at one or more ingress ports or VLANs or transmitted from one or more egress ports or VLANs.

45. The method of claim 32 wherein the one or more conditions are nested.

46. The method of claim 32 wherein the one or more actions comprise mirroring one or more packets to a port accessible by a network administrator.

47. The method of claim 32 wherein the one or more actions comprise redirecting one or more packets to a port accessible by a network administrator.

48. The method of claim 32 wherein the one or more actions comprise reconfiguring the switch.

49. The method of claim 32 wherein the one or more actions comprise sending one or more traps or trap messages to a server accessible by a network administrator.

50. The method of claim 32 wherein the one or more actions comprise logging one or more messages to a server accessible by a network administrator.

51. The method of claim 32 wherein the one or more actions comprise modifying one or more rules applicable to the network switch.

52. The method of claim 32 wherein the one or more actions comprise applying one or more additional rules to the network switch.

53. The method of claim 32 wherein one or more of the conditions specified the time one or more other conditions must be met.

54. Processor readable media including logic tangibly embodying one or more rules for performing one or more network switch functions by or for a network switch, the one or more rules conforming to an improved rule structure comprising: a first specification specifying (1) a packet profile; (2) a counter having a contents that are updated when a packet having the specified profile is received at or transmitted from the network switch; (3) a usage-derived packet statistic derived from the counter contents; (4) one or more conditions to be met by the usage-derived packet statistics during a check of the usage-derived packet statistic; and (5) an interval of time after which a check of the usage-derived packet statistic is repeated at least one or more times, the repeated check determining whether the usage-derived packet statistic derived from then current counter contents meets the specified one or more conditions; and a second specification defining one or more actions to be taken by the network switch whenever the specified one or more conditions are determined to be met during any of the checks that are performed.

55. Processor readable media including logic tangibly embodying one or more rules for performing one or more network switch functions by or for a network switch, the one or more rules conforming to an improved rule structure comprising: a first specification specifying (1) a packet profile; (2) a counter having a contents that are updated when a packet having the specified profile is received at or transmitted from the network switch; (3) a usage-derived packet statistic derived from the counter contents; (4) one or more conditions to be met by the usage-derived packet statistic, including a specification of the time at which one or more other conditions must be met, during a check of the usage-derived packet statistic; and (5) an interval of time after which a check of the usage-derived packet statistic is repeated at least one or more times, the repeated check determining whether the usage-derived packet statistic derived from then current counter contents meets the specified one or more conditions: and a second specification defining one or more actions to be taken by the network switch whenever the specified one or more conditions are determined to be met during any of the checks that are performed.

56. The processor readable media of claim 1 wherein, after the specified interval of time, a check of the usage-derived packet statistic is periodically repeated, at a period corresponding to the specified interval of time.

57. The system of claim 16 wherein, after the specified interval of time, a check of the usage-derived packet statistic is periodically repeated, at a period corresponding to the specified interval of time.

58. The method of claim 32 wherein, after the specified interval of time, a check of the usage-derived packet statistic is periodically repeated, at a period corresponding to the specified interval of time.

59. The processor readable media of claim 54 wherein, after the specified interval of time, a check of the usage-derived packet statistic is periodically repeated, at a period corresponding to the specified interval of time.

60. The processor readable media of claim 55 wherein, after the specified interval of time, a check of the usage-derived packet statistic is periodically repeated, at a period corresponding to the specified interval of time.

61. The processor readable media of claim 1 wherein the first specification specifies first and second packet profiles, and first and second counters, each having contents, wherein the first counter is updated when a packet meeting the specified first packet profile is received by or transmitted from the switch, the second counter is updated when a packet meeting the specified second packet profile is received by or transmitted from the switch, the usage-derived packet statistic is derived from the first and second counter contents, and the check determining whether the usage-derived packet statistic derived from current first and second counter contents meets the specified one or more conditions.

62. The system of claim 16 wherein the first specification specifies first and second packet profiles, and first and second counters, each having contents, wherein the first counter is updated when a packet meeting the specified first packet profile is received by or transmitted from the switch, the second counter is updated when a packet meeting the specified second packet profile is received by or transmitted from the switch, the usage-derived packet statistic is derived from the first and second counter contents, and the check determining whether the usage-derived packet statistic derived from current first and second counter contents meets the specified one or more conditions.

63. The method of claim 32 wherein the first specification specifies first and second packet profiles, and first and second counters, each having contents, wherein the first counter is updated when a packet meeting the specified first packet profile is received by or transmitted from the switch, the second counter is updated when a packet meeting the specified second packet profile is received by or transmitted from the switch, the usage-derived packet statistic is derived from the first and second counter contents, and the check determining whether the usage-derived packet statistic derived from current first and second counter contents meets the specified one or more conditions.

64. The processor readable media of claim 54 wherein the first specification specifies first and second packet profiles, and first and second counters, each having contents, wherein the first counter is updated when a packet meeting the specified first packet profile is received by or transmitted from the switch, the second counter is updated when a packet meeting the specified second packet profile is received by or transmitted from the switch, the usage-derived packet statistic is derived from the first and second counter contents, and the check determining whether the usage-derived packet statistic derived from current first and second counter contents meets the specified one or more conditions.

65. The processor readable media of claim 55 wherein the first specification specifies first and second packet profiles, and first and second counters, each having contents, wherein the first counter is updated when a packet meeting the specified first packet profile is received by or transmitted from the switch, the second counter is updated when a packet meeting the specified second packet profile is received by or transmitted from the switch, the usage-derived packet statistic is derived from the first and second counter contents, and the check determining whether the usage-derived packet statistic derived from current first and second counter contents meets the specified one or more conditions.

\* \* \* \* \*